(12) United States Patent
Eoff et al.

(10) Patent No.: US 11,254,860 B2
(45) Date of Patent: Feb. 22, 2022

(54) DIVERSION USING SOLID PARTICULATES

(71) Applicant: Halliburton Energy Services, Inc., Houston, TX (US)

(72) Inventors: Larry Steven Eoff, Porter, TX (US); Aaron Michael Beuterbaugh, Spring, TX (US); Travis Hope Larsen, Houston, TX (US); Shoy George Chittattukara, Thrissur (IN); Vishwajit Manajirao Ghatge, Pune (IN); Antonio Recio, III, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 36 days.

(21) Appl. No.: 16/644,336

(22) PCT Filed: Oct. 31, 2017

(86) PCT No.: PCT/US2017/059260
§ 371 (c)(1),
(2) Date: Mar. 4, 2020

(87) PCT Pub. No.: WO2019/088999
PCT Pub. Date: May 9, 2019

(65) Prior Publication Data
US 2021/0062074 A1    Mar. 4, 2021

(51) Int. Cl.
*E21B 43/27*    (2006.01)
*E21B 33/138*    (2006.01)
*E21B 43/267*    (2006.01)
*C09K 8/76*    (2006.01)
*C09K 8/80*    (2006.01)
(Continued)

(52) U.S. Cl.
CPC .............. *C09K 8/76* (2013.01); *C09K 8/5045* (2013.01); *C09K 8/516* (2013.01); *C09K 8/80* (2013.01); *E21B 33/138* (2013.01); *E21B 43/267* (2013.01); *E21B 43/27* (2020.05)

(58) Field of Classification Search
None
See application file for complete search history.

(56) References Cited

U.S. PATENT DOCUMENTS

| 7,775,278 B2 | 8/2010 | Willberg et al. |
| 9,562,423 B2 | 2/2017 | Eoff et al. |
| 9,598,631 B2 | 3/2017 | Recio, III et al. |

(Continued)

FOREIGN PATENT DOCUMENTS

| WO | 2013052291 | 4/2013 |
| WO | 2017079210 | 5/2017 |

OTHER PUBLICATIONS

ISRWO International Search Report and Written Opinion for PCT/US2017/059260 dated Jul. 31, 2018.

*Primary Examiner* — Charles R Nold
(74) *Attorney, Agent, or Firm* — Thomas Rooney; C. Tumey Law Group PLLC

(57) ABSTRACT

A method may comprise: introducing a treatment fluid into a wellbore penetrating a subterranean formation wherein the treatment fluid comprises a base fluid; a carbonate compound, wherein the carbonate compound at least partially plugs a zone in the subterranean formation; and an acid; and diverting at least a portion of the treatment fluid and/or a subsequently introduced fluid away from the zone.

22 Claims, 6 Drawing Sheets

(51) Int. Cl.
  *C09K 8/516* (2006.01)
  *C09K 8/504* (2006.01)

(56) References Cited

U.S. PATENT DOCUMENTS

| | | |
|---|---|---|
| 9,644,130 B2 | 5/2017 | Recio, III et al. |
| 10,421,896 B2 | 9/2019 | Eoff et al. |
| 10,487,261 B2 | 11/2019 | Beuterbaugh et al. |
| 11,022,248 B2* | 6/2021 | Tolman ............... F16L 55/1612 |
| 2002/0142919 A1 | 10/2002 | Constien |
| 2006/0118301 A1 | 6/2006 | East, Jr. et al. |
| 2006/0175059 A1 | 8/2006 | Sinclair et al. |
| 2011/0120712 A1* | 5/2011 | Todd ..................... E21B 43/267 166/280.1 |
| 2011/0214862 A1* | 9/2011 | Horton ..................... C09K 8/42 166/283 |
| 2013/0303412 A1* | 11/2013 | Luyster ................... C09K 8/12 507/236 |
| 2014/0213488 A1* | 7/2014 | Jamison ................... C09K 8/62 507/105 |
| 2019/0119552 A1* | 4/2019 | Sharma ................ E21B 33/138 |

* cited by examiner

DIVERSION USING SOLID PARTICULATES

BACKGROUND

After a well bore is drilled and completed in a zone of a subterranean formation, it may often be necessary to introduce a treatment fluid into the zone. As used herein "zone" simply refers to a portion of the formation and does not imply a particular geological strata or composition. For example, the producing zone may be stimulated by introducing a hydraulic fracturing fluid into the producing zone to create fractures in the formation, thereby increasing the production of hydrocarbons therefrom. In another example, a producing zone may require an acid treatment to enhance fractures already present in the formation. To insure that the producing zone is uniformly treated with the treatment fluid, a treatment fluid comprising a diverting agent may be used to ensure the treatment fluid contacts the entire zone requiring treatment. A subterranean formation may have sections of varying permeability, reservoir pressures and/or varying degrees of formation damage, and thus may accept varying amounts of certain treatment fluids. For example, low reservoir pressure in certain areas of a subterranean formation or a rock matrix or a proppant pack of high permeability may permit that portion to accept larger amounts of certain treatment fluids. It may be difficult to obtain a uniform distribution of the treatment fluid throughout the entire treatment interval. For instance, the treatment fluid may preferentially enter portions of the interval with low fluid flow resistance at the expense of portions of the treatment interval with higher fluid flow resistance. In some instances, these intervals with variable flow resistance may be water-producing intervals.

In some methods of treating such subterranean formations, once the less fluid flow-resistant portions of a subterranean formation have been treated, that area may be sealed off using a variety of techniques to divert treatment fluids to more fluid flow-resistant portions of the interval. Such techniques may have involved, among other things, the injection of particulates, foams, emulsions, plugs, packers, or blocking polymers (e.g., crosslinked aqueous gels) into the interval so as to plug off high-permeability portions of the subterranean formation once they have been treated, thereby diverting subsequently injected fluids to more fluid flow-resistant portions of the subterranean formation.

In some techniques, a solid particulate may be introduced into the wellbore and subsequently into the subterranean formation to bridge fractures and perforations to provide the diversion. Oftentimes, it is preferable to remove the solid particulates and other diverting agents after the treatment is completed to ensure maximum flow of formation fluids into the wellbore. Any solid particulates or diverting agent remaining in the treated zone may reduce the effective permeability of the zone and thereby decrease formation fluid production rates.

BRIEF DESCRIPTION OF THE DRAWINGS

These drawings illustrate certain aspects of some of the present disclosure, and should not be used to limit or define the disclosure.

DETAILED DESCRIPTION

Figure 1:
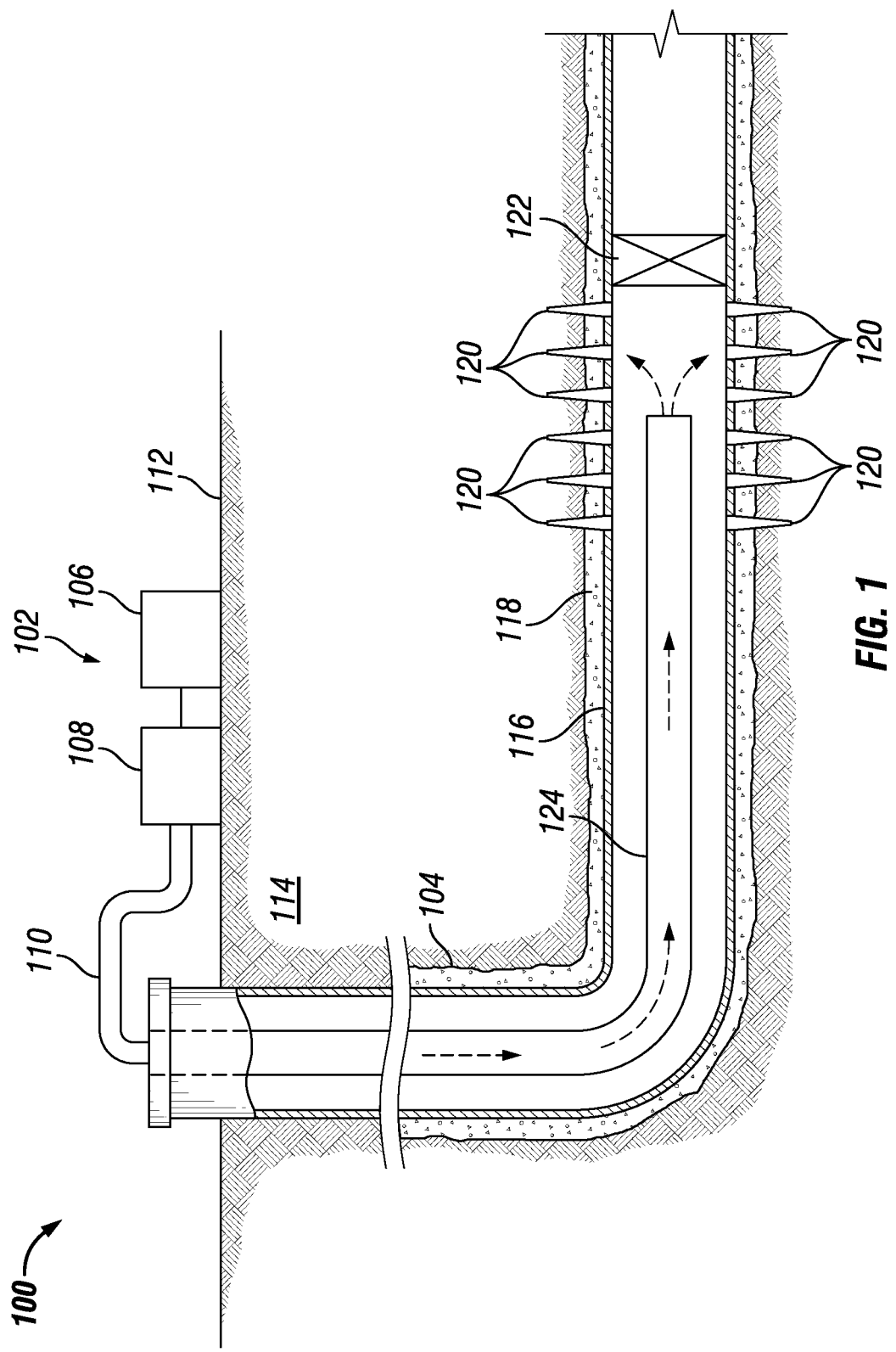
FIG. 1 is a schematic illustration of example well system showing placement of a treatment fluid into a wellbore.

The present disclosure is directed to subterranean treatments, and, at least in part, to using a solid particulate for controlling flow of fluids in wellbore applications, such as in diversion applications. Although many solid particulates have been previously used in diversion applications, there are several drawbacks such as high cost, low availability, and low mechanical strength, among others. Various diverting agents have been used in fracturing, acidizing, and other wellbore operations to control the area of the formation where a treatment fluid is applied or acting on. An operator may choose to apply a diverting agent to a particular formation zone to block off the treatment fluid from acting in that zone. A diverting agent may be provided to plug perforations or bridge fractures in the formation thereby diverting the flow of a treatment fluid to another formation zone or flow path.

While any particles that are capable of being pumped into a zone in a formation and plug the zone may be classified as a diverting agent, a particular problem with diversion operations may include producing formation fluids from zones that have been plugged with a diverting agent. For this reason, there have been developments in degradable and dissolvable solid particulates that may be readily removed after the formation treatment is completed. Many dissolvable and degradable synthetic polymers have been developed that may act as diverters but there are challenges involved with producing particle sizes large enough to bridge fractures and/or the synthetic polymers may lack the mechanical strength necessary to bridge larger perforations and fractures and hold pressure. Additional challenges involve softening and loss of mechanical strength of the synthetic polymers with elevated temperatures.

Accordingly, the present disclosure provides a diverting agent that may comprise a solid particulate that is included in a treatment fluid. The solid particulates may be soluble, slightly soluble, or insoluble in water. Some examples of suitable soluble solid particulates may include group (I) and group (II) monovalent and divalent salts such as sodium chloride, potassium chloride, magnesium chloride, calcium chloride, or combinations thereof. Some examples of slightly soluble solid particulates may include carbonate compounds such as magnesium carbonate, calcium carbonate, or combinations thereof. Some examples of insoluble solid particulates may include sand, bauxite, glass, ceramics, and combinations thereof. The solid particulates may be present in any amount for a particular application. In some examples, the solid particulates may be present in the treatment fluid in an amount of about 1% to about 50% by volume of the treatment fluid. In other examples, the solid particulates may be present in the treatment fluid in an amount of about 1% to about 10% by volume of the treatment fluid, about 10% to about 20% by volume of the treatment fluid, about 20% to about 30% by volume of the treatment fluid, about 30% to about 40% by volume of the treatment fluid, or about 40% to about 50% by volume of the treatment fluid.

By way of example, the solid particulates may have any physical shape as well as an irregular geometry, including the physical shape of platelets, shavings, fibers, flakes, ribbons, rods, strips, spheroids, beads, toroids, pellets, tablets, or any other physical shape. In some examples, the solid particulates may have an average particle size in the range of about 5 microns to about 5000 microns. In some examples, the solid particulates may have an average particle size in the range of about 20 microns to about 500 microns. However, particle sizes outside these defined ranges also may be suitable for particular applications. Particle sizes may be measured using any suitable method such sieve analysis or laser light scattering. A suitable instrument for determining particle size may be a particle size analyzer from the Malvern Company.

As previously discussed, it may be preferable that a diverting agent introduced into the wellbore be at least partially dissolvable, degradable, or removable to ensure production of formation fluids may be minimally affected by the diverting agent. Where the solid particulate is soluble in water, the solid particulate may be readily removed by waiting until the solid particulate is dissolved. Where the solid particulate is slightly soluble or may become soluble under certain conditions, a chemical agent that increases the solubility of the solid particulate or reacts with the solid particulate to increase the solubility may be included in the treatment fluid. In examples where the solid particulate is insoluble in water, the solid particulate may still allow production of formation fluids and provide additional beneficial properties to the near wellbore region such as propping of fractures.

Where a solid particulate is included in a treatment fluid, the rate of dissolution may be too slow to effectively remove the solid particulate from a perforation or fracture. One or more solubility modifying chemical compounds may be included in the treatment fluid to increase the rate of dissolution either by changing the solubility of the solid particulate or by reacting with the soluble solid particulate. In an example where the solid particulate is a carbonate compound such as calcium carbonate or magnesium carbonate, the solubility of the carbonate compound in water may be relatively low even at wellbore temperatures. An acid may be included in the treatment fluid to react with the carbonate compound to produce more soluble products. In particular, calcium carbonate should react with an acid to produce carbon dioxide gas, water, and soluble calcium salt. The more soluble reaction products may be more readily dissolved into water present in the treatment fluid and thereby be removed from the fracture or perforation. Similar soluble reaction products may be made with other carbonate compounds and acids. Suitable acids may be any solid acid with solubility less than about 5% by weight in water at 110° F. (43.33° C.) after 1 hour. Other suitable acids may include solid acids such as, without limitation, ethylenediaminetetraacetic acid (EDTA), citric acid, benzoic acid. Solid acids may additionally comprise coated solid acids, wherein the coating may be a soluble polymeric compound, an oil wetting compound, or other encapsulating chemicals well known in the art. The polymeric soluble polymeric compound may be a dissolvable polymer. One of ordinary skill should be able to select a coating for a particular application. Liquid acids such as acetic acid and formic acid may be used in addition to or in place of a solid acid. One of ordinary skill in the art with the benefit of this disclosure should be able to select an acid for a particular application.

The acid and carbonate compounds may be present in any weight ratio. In order to completely remove the carbonate compounds from a fracture or perforation, the acid may be present in a stoichiometric amount or greater to react with the carbonate compound. Alternatively, the acid and carbonate compound may be present in a weight ratio of about 10/90 acid to carbonate species, about 20/80 acid to carbonate species, about 30/70 acid to carbonate species, about 40/60 acid to carbonate species, about 50/50 acid to carbonate species, about 60/40 acid to carbonate species, about 70/30 acid to carbonate species, about 80/10 acid to carbonate species, about 90/10 acid to carbonate species, or any ratio between. One of ordinary skill in the art with the benefit of this disclosure should be able to select an appropriate weight ratio for a particular application.

In some instances, the acid and carbonate compound may react before the carbonate compound is able to bridge a fracture or perforation. A method of controlling the rate of reaction may include adding a retarding agent to prevent the acid and carbonate compound from reacting or to slow the reaction. A retarding agent may comprise an oil-wetting surfactant that coats the carbonate and slows the attack of the acid. Examples of such surfactants include sulfonates, sulfates, carboxylates and phosphonates. An example of a suitable retarding agent may be an alkylbenzenesulfonate such as sodium dodecylbenzenesulfonate. It is believed that sodium dodecylbenzenesulfonate adsorbs to the surface of carbonate compound leaving the carbonate compound in an oil wet state thereby slowing the rate of attack of the acid. Other compounds that may slow the rate of attack include polymeric compounds such as acrylates, which may coat the carbonate. A specific acrylate compound may be emulsions of 2-ethylhexyl acrylate. The retarding agent may be present in any amount suitable for a particular application. In particular, the retarding agent may be provided as a liquid and may be present in any amount from about 1 gallon per thousand gallons (gpt) to about 30 gpt, about 5 gpt to about 10 gpt, about 10 gpt to about 15 gpt, about 15 gpt to about 20 gpt, about 20 gpt to about 25 gpt, about 25 gpt to about 30 gpt, or any values between the ranges. One of ordinary skill in the art would understand that a volume ratio such as gpt is equivalent to any other volume ratio. For example, a ratio of 5 gpt is equivalent to 5 liters per thousand liters. Alternatively, the retarding agent may be present in an amount of about 0.1% by weight to about 5% by weight of the carbonate or any value between the ranges. Alternatively, about 0.1% to about 0.5% by weight of the carbonate, about 0.5% to about 1.5% by weight of the carbonate, about 1.5% to about 2.5%, about 2.5% to about 3% by weight of the carbonate, about 3% to about 3.5% by weight of the carbonate, about 3.5% to about 4% by weight of the carbonate, about 4% to about 4.5% by weight of the carbonate, or about 4.5% to about 5% by weight of the carbonate.

Another method of reducing the rate of reaction between the carbonate compound and acid may involve coating the carbonate compound, acid, or both with a soluble or degradable coating. Some soluble or degradable coatings may include, but are not limited to, polyvinyl alcohol (PVA), polylactic acid (PLA), polyacrylamide, or combinations thereof. A solid state suspension comprising a soluble or degradable coating as the continuous phase with interspersed carbonate compound and solid acid throughout the soluble or degradable coating phase may act to slow the reaction of the carbonate compound and solid acid. The soluble or degradable coating may be soluble in water and may degrade over time to allow water to interact with the solid acid. The solid acid may then dissolve and subsequently attack the carbonate compound to form soluble products as previously described. Degradation time of the carbonate compound may be adjusted by controlling the thickness of the continuous soluble or degradable coating between the dispersed solid acid and carbonate particles and the aqueous solution outside the soluble or degradable coating. For example, a relatively thicker layer of soluble or degradable coating may take longer to dissolve enough to expose the solid acid than a relatively thinner layer of soluble or degradable coating. The solid state dispersion may have any dissolution time appropriate for a certain application. For example, the solid state dispersion may have a dissolution time from about 5 minutes to about 24 hours.

A soluble or degradable material such as PVA by itself may not have sufficient mechanical strength to bridge fractures and perforations. The addition of a carbonate compound may increase the mechanical strength of the soluble or degradable coating such that the composite material may effectively bridge fractures. Another method to increase the mechanical strength of the soluble or degradable coating may be to include solid particles other than carbonate compounds alone or in addition to the carbonate compound. Some examples of suitable solid particles include rock salt, sand, and bauxite. In addition to strengthening the soluble or degradable coating, inclusion of a solid particle may have other beneficial results. For example, including sand or bauxite may allow the sand or bauxite to be deposited in a fracture thereby providing a propping action to the fracture. As the soluble or degradable coating dissolves away, insoluble sand and bauxite may be placed in the fracture which may provide increased permeability from the fracture as compared to the same fracture without proppant.

A dissolvable solid particulate may be included in a solid state suspension of a soluble or degradable coating. Solid particles that are soluble in water may be included in the solid state suspension without any additional chemical agents to increase solubility. Rock salt may be a desirable solid particulate to include in a treatment fluid but a high dissolution rate may not allow the rock salt to traverse the entire length of the wellbore and be placed in a fracture or perforation to provide diversion. The soluble or degradable coating may be coated on the dissolvable solid particulates such as rock salt to provide increased mechanical strength for the soluble or degradable coating and protection from dissolution for the rock salt or other solid dissolvable particulates.

A solid state suspension of soluble or degradable coating and solid particulate may comprise any particle size and shape for a particular application. The solid state suspension may be manufactured by any means, including, but not limited to, hot melt extrusion. In some instances, a plasticizer may be included in the soluble or degradable coating to promote plasticity in the soluble or degradable coating during extrusion. Some examples of plasticizers may include glycol, polyethylene glycol, polypropylene glycol, fatty acid esters, lactide monomers, glycolide monomers, citric acid esters, epoxidized oil, adipate ester, azaleate ester, acetylated coconut oil, and/or surfactants are commonly listed plasticizers. The plasticizer may be present in an amount of about 0.1% to 50% by weight of the solid state suspension. An extrusion process may allow production of solid state suspensions of soluble or degradable coating to be manufactured to any desired particle size and shape.

Any of the previously mentioned solid particles, chemicals, coatings, and solid state suspensions may be included as a diverting agent in a treatment fluid. The diverting agent may be included in a treatment fluid which may be placed downhole. Examples of treatment fluids include, but are not limited to, cement compositions, drilling fluids or muds, spacer fluids, lost circulation fluids, fracturing fluids, diverting fluids or completion fluids. Suitable treatments fluids may include, without limitation, an aqueous gel, a viscoelastic surfactant gel, an oil gel, a foamed gel, an emulsion, an inverse emulsion, a slickwater fluid, aqueous fluids or combinations thereof. The treatment fluid may be for use in a wellbore that penetrates a subterranean formation. One of ordinary skill in the art with the benefit of this disclosure should be able to select an appropriate amount and type of diverting agent to use for a particular application.

Without limitation, placing the diverting agent into the subterranean formation may include placement into a wellbore or into the region of the subterranean formation surrounding the wellbore. In the subterranean formation, the diverting agent may form a barrier to fluid flow. Without limitation, this barrier to fluid flow may be used for controlling fluid, for example, in diversion to divert treatment fluids to another area, or in fluid loss control to reduce leak off into the subterranean formation. Advantageously, the diverting agent may be degradable so that they can be easily removed from the subterranean formation to facilitate production, for example, without the needs for additional removal applications.

The treatment fluid may comprise a base fluid and diverting agent. Examples of suitable base fluids may be aqueous or non-aqueous. Suitable non-aqueous fluids may include one or more organic liquids, such as hydrocarbons (e.g., kerosene, xylene, toluene, or diesel), oils (e.g., mineral oils or synthetic oils), esters, and the like. Suitable aqueous base fluids may comprise, without limitation, freshwater, saltwater, brine, seawater, or any other suitable base fluids that preferably do not undesirably interact with the other components used in the treatment fluids. Generally, the base fluid may be present in the treatment fluids in an amount in the range of from about 45% to about 99.98% by volume of the treatment fluid. For example, the base fluid may be present in the treatment fluids in an amount in the range of from about 65% to about 75% by volume of the treatment fluid.

The treatment fluid may comprise any number of additional additives, including, but not limited to, salts, surfactants, acids, fluid loss control additives, gas, foamers, corrosion inhibitors, scale inhibitors, catalysts, clay control agents, biocides, friction reducing polymers, antifoam agents, bridging agents, dispersants, flocculants, $H_2S$ scavengers, $CO_2$ scavengers, oxygen scavengers, lubricants, gelling agents, breakers, weighting agents, particulate materials (e.g., proppant particulates) and any combination thereof. With the benefit of this disclosure, one of ordinary skill in the art should be able to recognize and select suitable additives for use in the treatment fluid.

Optionally, proppant particulates may be included in the treatment fluid. For example, where the treatment fluid is a fracturing fluid, the treatment fluid may transport proppant particulates into the subterranean formation. Examples of suitable proppant particulates may include, without limitation, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Without limitation, the proppant particulates may comprise graded sand. Other suitable proppant particulates that may be suitable for use in subterranean applications may also be useful. Without limitation, the proppant particulates may have a particle size in a range from about 2 mesh to about 400 mesh, U.S. Sieve Series. The proppant particulates may be carried by the treatment fluid. Without limitation, the proppant particulates may be present in the treatment fluid in a concentration of about 0.1 pounds per gallon (ppg) to about 10 ppg, about 0.2 ppg to about 6 ppg. These ranges encompass every number in between, for example. For example, the concentration may range between about 0.5 ppg to about 4 ppg. One of ordinary skill in the art with the benefit of this disclosure should be able to select an appropriate amount of the proppant particulates to use for a particular application.

Optionally, the treatment fluid may be an acidic treatment fluid. The treatment fluid may be an aqueous acid treatment fluid, for example, when used in acidizing treatments. By way of example, the treatment fluid may comprise one or more acids, including, but not limited to, mineral acids, such as hydrochloric acid and hydrofluoric acid, organic acids, such as acetic acid, formic acid, and other organic acids, chelating acids, such as ethylenediamine tetracetic acid, or mixtures thereof. In acidizing treatments, mixtures of hydrochloric acid and hydrofluoric may be used, in some instances.

Optionally, the treatment fluid may comprise a friction reducing polymer. The friction reducing polymer may be included in the treatment fluid to form a slickwater fluid, for example. The friction reducing polymer may be a synthetic polymer. Additionally, for example, the friction reducing polymer may be an anionic polymer or a cationic polymer. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. Without limitation, the friction reducing polymer may be included in the treatment fluid to provide a desired amount of friction reduction. For example, the friction reducing polymer may be included in the treatment fluid, for example, in an amount equal to or less than 0.2% by weight of an aqueous-based fluid present in the treatment fluid. Without limitation, the friction reducing polymer may be included in the treatment fluid in an amount sufficient to reduce friction without gel formation upon mixing. By way of example, the treatment fluid comprising the friction reducing polymer may not exhibit an apparent yield point.

Optionally, the treatment fluid may comprise a gelling agent. The gelling agent may be included in the treatment fluid to form an aqueous gel, foamed gel, or oil gel, for example. Suitable gelling agents may comprise any polymeric material capable of increasing the viscosity of a base fluid, such as an aqueous fluid. Without limitation, the gelling agent may comprise polymers that have at least two molecules that may be capable of forming a crosslink in a crosslinking reaction in the presence of a crosslinking agent, and/or polymers that have at least two molecules that are so crosslinked (i.e., a crosslinked gelling agent). Other suitable gelled fluids may include linear gels that are not crosslinked. The gelling agents may be naturally-occurring, synthetic, or a combination thereof. Suitable gelling agents may comprise polysaccharides, and derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), and combinations thereof. The gelling agents comprise an organic carboxylated polymer, such as CMHPG. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used. Where used, the gelling agent may be present in the treatment fluids in an amount sufficient to provide the desired viscosity. Without limitation, the gelling agents may be present in an amount in the range of from about 0.10% to about 10% by weight of the treatment fluid and, alternatively, from about 0.5% to about 4% by weight of the treatment fluid.

Optionally, a crosslinking agent may be included in the treatment fluids where it is desirable to crosslink the gelling agent. The crosslinking agent may comprise a metal ion that is capable of crosslinking at least two molecules of the gelling agent. Examples of suitable crosslinking agents include, but are not limited to, borate ions, zirconium IV ions, titanium IV ions, aluminum ions, antimony ions, chromium ions, iron ions, copper ions, and zinc ions. These ions may be provided by providing any compound that is capable of producing one or more of these ions, examples of such compounds include, but are not limited to, boric acid, disodium octaborate tetrahydrate, sodium diborate, pentaborates, ulexite, colemanite, zirconium lactate, zirconium triethanol amine, zirconium lactate triethanolamine, zirconium carbonate, zirconium acetylacetonate, zirconium maleate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, aluminum citrate, antimony compounds, chromium compounds, iron compounds, copper compounds, zinc compounds, and combinations thereof. Without limitation, the crosslinking agent may be formulated to remain inactive until it is "activated" by, among other things, certain conditions in the fluid (e.g., pH, temperature, etc.) and/or contact with some other substance. Without limitation, the crosslinking agent may be delayed by encapsulation with a coating (e.g., a porous coating through which the crosslinking gent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following, the type of gelling agent included, the molecular weight of the gelling agent(s), the pH of the treatment fluid, temperature, and/or the desired time for the crosslinking agent to crosslink the gelling agent molecules.

Where used, suitable crosslinking agents may be present in the treatment fluids in an amount sufficient to provide, inter alia, the desired degree of crosslinking between molecules of the gelling agent. Without limitation, the crosslinking agent may be present in the treatment fluids of the present treatment fluids in an amount in the range of from about 0.0005% to about 0.2% by weight of the treatment fluid or alternatively from about 0.001% to about 0.05% by weight of the treatment fluid. One of ordinary skill in the art, with the benefit of this disclosure, should recognize the appropriate amount of crosslinking agent to include in a treatment fluid based on, among other things, the temperature conditions of a particular application, the type of gelling agents used, the molecular weight of the gelling agents, the desired degree of viscosification, and/or the pH of the treatment fluid.

Optionally, the treatment fluid may further comprise a gel breaker, which may be useful for reducing the viscosity of the viscosified fracturing fluid at a specified time. A gel breaker may comprise any compound capable of lowering the viscosity of a viscosified fluid. The term "break" (and its derivatives) as used herein refers to a reduction in the viscosity of the viscosified treatment fluid, e.g., by the breaking or reversing of the crosslinks between polymer molecules or some reduction of the size of the gelling agent polymers. No particular mechanism is implied by the term. Suitable gel breaking agents for specific applications and gelled fluids are known to one skilled in the arts. Nonlimiting examples of suitable breakers include oxidizers, peroxides, enzymes, acids, and the like. Some viscosified fluids also may break with sufficient exposure of time and temperature.

Example methods of using the diverting agent will now be described in more detail. As previously described, the diverting agent may be placed in the subterranean formation such that a barrier to fluid flow may be formed. Without limitations, the diverting agent particulates may form packs, bridges, filter cakes, or other suitable barriers to thereby obstruct fluid flow. Without limitation, this barrier to fluid flow may be used, for example, in diversion to divert treatment fluids to another area and in fluid loss control to reduce leak off into the subterranean formation. The fluid flow preventing barrier may be formed in the subterranean formation to block certain flow paths in the subterranean formation, reducing the flow of fluids through the subterranean formation. Examples of the types of flow paths that may be blocked by the fluid flow preventing barrier include, but are not limited to, perforations, such as those formed by a perforation gun, fissures, cracks, fractures, streaks, flow channels, voids, vugs high permeable streaks, annular voids, or combinations thereof, as well as any other zone in the formation through which fluids may undesirably flow.

As will be appreciated by those of ordinary skill in the art, the diverting agent may be used in a variety of subterranean operations, where formation of a fluid flow diverting (or flow preventing) barrier may be desired, such as fluid diversion, and fluid loss control. Fluid diversion may be desired in a number of subterranean treatments, including fracturing and acidizing. Fluid loss control may be desired in a number of subterranean treatments, including, without limitation, drilling operations, fracturing operations, acidizing operations, and gravel packing operations. The diverting agent may be used prior to, during, or subsequent to a variety of subterranean operations. Methods of using the diverting agent may first include preparing a treatment fluid comprising the diverting agent. The treatment fluids may be prepared in any suitable manner, for example, by combining the diverting agent, base fluid, and any of the additional components described herein in any suitable order.

Methods may include introduction of the diverting agent into a subterranean formation. Introduction into the subterranean formation is intended to include introduction into a wellbore penetrating a subterranean formation, introduction into the zone(s) surrounding the wellbore, or both. A treatment fluid containing the diverting agent may dissipate into the subterranean formation through openings, which may be naturally occurring (e.g., pores, cracks, fractures, fissures, etc.) or man-made. As the treatment fluid dissipates into the subterranean formation, the diverting agent may be screened out by the formation, whereby the diverting agent may be packed into the openings. In the subterranean formation, the diverting agent form a flow preventing barrier that blocks certain flow paths therein, reducing the flow of fluids through the subterranean formation. Examples of the types of flow paths that may be blocked by the diverting agent include, but are not limited to, perforations, such as those formed by a perforation gun, fissures, cracks, fractures, streaks, flow channels, voids, high permeable streaks, annular voids, or combinations thereof, as well as any other zone in the formation through which fluids may undesirably flow. Methods may further include selecting one or more zones of the subterranean formation for control of fluid flow in which the diverting agent may be introduced.

The diverting agent may be used as fluid loss control agents, among others. Providing effective fluid loss control for subterranean treatment fluids may be highly desirable. "Fluid loss," as that term is used herein, refers to the undesirable migration or loss of fluids (such as the fluid portion of a drilling mud or cement slurry) into a subterranean formation and/or a proppant pack. Treatment fluids may be used in any number of subterranean operations, including drilling operations, fracturing operations, acidizing operations, gravel-packing operations, acidizing operations, well bore clean-out operations, and the like. Fluid loss may be problematic in any number of these operations. In fracturing treatments, for example, fluid loss into the formation may result in a reduction in fluid efficiency, such that the fracturing fluid cannot propagate the fracture as desired. Fluid loss control materials are additives that lower the volume of a filtrate that passes through a filter medium. That is, they block the pore throats and spaces that otherwise allow a treatment fluid to leak out of a desired zone and into an undesired zone. Particulate materials may be used as fluid loss control materials in subterranean treatment fluids to fill/bridge the pore spaces in a formation matrix and/or proppant pack and/or to contact the surface of a formation face and/or proppant pack, thereby forming a type of filter cake that blocks the pore spaces in the formation or proppant pack, and prevents fluid loss therein. Without limitation, when the diverting agent particulates may be used as a fluid loss control agent, it may be used in conjunction with a fracturing or drilling operation. For example, the diverting agent may be included in a treatment fluid that is then placed into the portion of the subterranean formation at a pressure/rate sufficient to create or extend at least one fracture in that portion of the subterranean formation.

Diverting agents have similar actions but strive for a somewhat different approach. Diverting agents may be used to seal off a portion of the subterranean formation. By way of example, in order to divert a treatment fluid from permeable portions of the formation into the less permeable portions of the formation, a volume of treatment fluid may be pumped into the formation followed by diverting agent to seal off a portion of the formation where the first treatment fluid penetrated. When desired for diversion, the diverting agent may be added to the first treatment fluid or a slug of another treatment fluid may be prepared that contains the diverting agent. After the diverting agent is placed, a second treatment fluid may be placed wherein the second treatment fluid will be diverted to a new zone for treatment by the previously placed diverting agent. When being placed, the treatment fluid containing the diverting agent will flow most readily into the portion of the formation having the largest pores, fissures, or vugs, until that portion is bridged and sealed, thus diverting the remaining fluid to the next most permeable portion of the formation. These steps may be repeated until the desired number of stages of treating fluid has been pumped. Without limitation, diverting agent particulates may be included in treatment fluids introduced at matrix flow rates; that is, flow rates and pressures that are below the rate/pressure sufficient to create or extend fractures in that portion of a subterranean formation. Alternatively, the treatment fluids comprising diverting agent may be introduced above the fracturing pressure of the subterranean formation.

As previously described, the diverting agent may be used in fracturing treatments. A method of fracturing a wellbore may comprise placing a fracturing fluid into a portion of a wellbore. The fracturing fluid may be used to create or extend one or more fractures in the subterranean formation. The fracturing fluid may enter flow paths to create one or more primary fractures extending from the wellbore into the subterranean formation. Branches may extend from the primary fractures. A fracturing fluid, commonly referred to as a pre-pad or pad fluid, may be injected to initiate the fracturing of a subterranean formation prior to the injection of proppant particulates. The pre-pad or pad fluid may be proppant-free or substantially proppant-free. The proppant particulates may be suspended in a fracturing fluid which may be injected into the subterranean formation to create and/or extend at least one fracture. In order to create and/or extend a fracture, a fluid is typically injected into the subterranean formation at a rate sufficient to generate a pressure above the fracturing pressure.

In the fracturing treatment, it may be desired to plug previously formed flow paths in order to fracture additional portions of the subterranean formation. The diverting agent may be introduced into the subterranean formation to form a barrier that restricts entry of additional fracturing fluid within the previously formed flow paths. An example method may include introducing a fracturing fluid into a subterranean formation at or above a fracturing pressure of the subterranean formation. The method may further include introducing a diverting agent into the subterranean formation to thereby form a barrier that restricts fluid flow at a first location in the subterranean formation. The method may further include diverting the fracturing fluid to a second location in the subterranean formation. The diverting agent may be placed into the subterranean formation by forming a slug of a treatment fluid having a different composition than the fracturing fluid or by adding the diverting agent directly to the fracturing fluid, for example, creating a slug of the fracturing fluid comprising the diverting agent. The diverting agent may form a barrier at the first location to selectively place the fracturing fluid at one or more additional locations in the subterranean formation.

After a well treatment using the diverting agent, the wellbore and/or the subterranean formation may be prepared for production, for example, production of a hydrocarbon, therefrom. Preparing the wellbore and/or formation for production may comprise removing the diverting agent from one or more flow paths, for example, by allowing the diverting agent to degrade and subsequently recovering hydrocarbons from the formation via the wellbore. As previously described, the diverting agent may be degradable such that the barrier formed by the diverting agent may be removed. The degradable material may be degraded by materials purposely placed in the formation by injection, mixing the degradable particle with delayed reaction degradation agents, or other suitable means previously described to induce degradation.

Removal of the diverting agent particulates, if desired, may be effected by any number of suitable treatments. By way of example, the diverting agent may be removed by acid hydrolysis and/or by contact with oxidizers. Removal may include contacting the diverting agent with an oxidizer, such as persulfate, alkali metal chlorite or hypochlorite, peroxides, ammonium or metal chlorate, bromate, iodates or perchlorate, perbromate, or periodate. Without limitation, specific examples of suitable oxidizers may include sodium persulfate, ammonium persulfate, potassium persulfate, lithium hypochlorite, or sodium hypochlorite, calcium hypochlorite, sodium chlorate, sodium bromate, sodium iodate, sodium perchlorate, sodium perbromate, sodium periodate, potassium chlorate, potassium bromate, potassium iodate, potassium perchlorate, potassium perbromate, potassium periodate, ammonium chlorate, ammonium bromate, ammonium iodate, ammonium perchlorate, ammonium perbromate, ammonium periodate, magnesium chlorate, magnesium bromate, magnesium iodate, magnesium perchlorate, magnesium perbromate, magnesium periodate, zinc chlorate, zinc bromate, zinc iodate, zinc perchlorate, zinc perbromate, zinc periodate, sodium perborate, t-butyl hydroperoxide, or combinations thereof. The oxidizer may be introduced into the formation by way of the wellbore. Without limitation, the diverting agent particulates may be susceptible to hydrolysis by acids.

Accordingly, this disclosure describes systems, compositions, and methods that may use diverting agent particulates for diversion, fluid loss control, and/or other subterranean treatments for controlling fluid flow in subterranean formations. Without limitation, the systems, compositions, and methods may include any of the following statements:

Statement 1. A method comprising: introducing a treatment fluid into a wellbore penetrating a subterranean formation wherein the treatment fluid comprises a base fluid; a carbonate compound, wherein the carbonate compound at least partially plugs a zone in the subterranean formation; and an acid; and diverting at least a portion of the treatment fluid and/or a subsequently introduced fluid away from the zone.

Statement 2. The method of statement 1 wherein the carbonate compound comprises magnesium carbonate, calcium carbonate, or combinations thereof.

Statement 3. The method of statement 1 or 2 wherein the acid is a solid acid with a solubility of less than about 5% by weight in water at 110° F. for one hour.

Statement 4. The method of any previous statement wherein the acid is a solid acid selected from the group consisting of ethylenediaminetetraacetic acid, citric acid, formic acid, benzoic acid, and combinations thereof.

Statement 5. The method of any previous statement wherein the treatment fluid further comprises a retarding agent comprising an oil-wetting surfactant, polymers coating the carbonate compound, or combinations thereof.

Statement 6. The method of any previous statement wherein the treatment fluid further comprises a retarding agent selected from the group consisting of sodium dodecylbenzenesulfonate, emulsions of 2-ethylhexyl acrylate, and combinations thereof.

Statement 7. The method of any previous statement wherein the retarding agent is present in an amount of about 0.1% to about 5% by weight of the carbonate compound.

Statement 8. The method of any previous statement further comprising introducing a fracturing fluid into the wellbore wherein the fracturing fluid comprises a proppant.

Statement 9. The method of any previous statement wherein the fracturing fluid is injected into the wellbore at or above a fracture gradient of the subterranean formation and the treatment fluid is intermittently injected into the wellbore while the fracturing fluid is injected into the wellbore.

Statement 10. The method of any previous statement wherein prior to the step of introducing, the treatment fluid is mixed in a mixer and thereafter injected using a pump.

Statement 11. A method of treating a subterranean formation, the method comprising: providing a treatment comprising: a base fluid; a solid state suspension comprising: a polymeric coating; a carbonate compound; an acid; introducing the treatment fluid into a wellbore penetrating the subterranean formation, wherein the solid state suspension at least partially plug a zone in the subterranean formation; and allowing the solid state suspension to dissolve Statement 12. The method of statement 11 wherein the treatment fluid comprises a solid acid selected from the group consisting of ethylenediaminetetraacetic acid, citric acid, benzoic acid, and combinations thereof.

Statement 13. The method of statement 11 or 12 wherein the treatment fluid further comprises a proppant.

Statement 14. The method of statement 11 through 13 wherein the step of introducing comprises pumping the treatment fluid into the subterranean formation at or above a fracture gradient of the subterranean formation.

Statement 15. The method of any one of statements 11 through 14 wherein the carbonate compound is present in an amount of about 30% to about 60% by weight of the solid state suspension;

Statement 16. The method of any one of statements 11 through 15 wherein the acid is present in an amount of about 40% to about 60% by weight of the solid state suspension, and wherein the polymeric coating comprises a polymer selected from the group consisting of polyvinyl alcohol, polylactic acid, polyacrylamide, and combinations thereof.

Statement 17. A treatment fluid comprising: a base fluid; and a diverting agent comprising: a solid particulate; and a coating agent selected from the group consisting of polyvinyl alcohol, polylactic acid, polyacrylamide, and combinations thereof.

Statement 18. The treatment fluid of statement 17 wherein the solid particulate is selected from the group consisting of calcium carbonate, magnesium carbonate, group (I) salts, group (II) salts, sand and combinations thereof.

Statement 19. The treatment fluid of any one of statements 17 or 18 wherein the base fluid comprises water.

Statement 20. The treatment fluid of any one of statements 17 through 19 wherein the diverting agent further comprises a solid acid selected from the group consisting of ethylenediaminetetraacetic acid, citric acid, benzoic acid, and combinations thereof.

Statement 21. The treatment fluid of any one of statements 17 through 20 wherein the solid particulate is acid soluble and the treatment fluid further comprises an acid.

Statement 22. The treatment fluid of any one of statements 17 through 21 where the solid particulate is incorporated into the polyvinyl alcohol in a solid state suspension.

Example methods of using the diverting agent particulates will now be described in more detail with reference to FIG. 1. Any of the previous examples of the diverting agent particulates may apply in the context of FIG. 1. FIG. 1 illustrates an example well system 100 that may be used for preparation and delivery of a treatment fluid downhole. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure.

Referring now to FIG. 1, a fluid handling system 102 is illustrated. The fluid handling system 102 may be used for preparation of a treatment fluid comprising the diverting agent and for introduction of the treatment fluid into a wellbore 104. The fluid handling system 102 may include mobile vehicles, immobile installations, skids, hoses, tubes, fluid tanks or reservoirs, pumps, valves, and/or other suitable structures and equipment. As illustrated, the fluid handling system 102 may comprise a fluid supply vessel 106, pumping equipment 108, and wellbore supply conduit 110. While not illustrated, the fluid supply vessel 106 may contain one or more components of the treatment fluid (e.g., diverting agent particulates, base fluid, etc.) in separate tanks or other containers that may be mixed at any desired time. Pumping equipment 108 may be fluidically coupled with the fluid supply vessel 106 and wellbore supply conduit 110 to communicate the treatment fluid into wellbore 104. Fluid handling system 102 may also include surface and downhole sensors (not shown) to measure pressure, rate, temperature and/or other parameters of treatment. Fluid handling system 102 may also include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection of the treatment fluid. As depicted in FIG. 1, the fluid supply vessel 106 and pumping equipment 108 may be above the surface 112 while the wellbore 104 is below the surface 112. As will be appreciated by those of ordinary skill in the art, well system 100 may be configured as shown in FIG. 1 or in a different manner, and may include additional or different features as appropriate. By way of example, fluid handling system 102 may be deployed via skid equipment, marine vessel, or may be comprised of sub-sea deployed equipment.

Without continued reference to FIG. 1, well system 100 may be used for introduction of a treatment fluid into wellbore 104. The treatment fluid may contain a base fluid (which may be oil- or aqueous-based) and diverting agent, described herein. Generally, wellbore 104 may include horizontal, vertical, slanted, curved, and other types of wellbore geometries and orientations. Without limitation, the treatment fluid may be applied through the wellbore 104 to subterranean formation 114 surrounding any portion of wellbore 104. As illustrated, the wellbore 104 may include a casing 116 that may be cemented (or otherwise secured) to wellbore wall by cement sheath 118. Perforations 120 allow the treatment fluid and/or other materials to flow into and out of the subterranean formation 114. A plug 122, which may be any type of plug (e.g., bridge plug, etc.) may be disposed in wellbore 104 below the perforations 120 if desired. While FIG. 1 illustrates used of treatment fluid in a cased section of wellbore 104, it should be understood that treatment fluid may also be used in portions of wellbore 104 that are not cased.

The treatment fluid comprising the diverting agent may be pumped from fluid handling system 102 down the interior of casing 116 in wellbore 104. As illustrated, well conduit 124 (e.g., coiled tubing, drill pipe, etc.) may be disposed in casing 116 through which the treatment fluid may be pumped. The well conduit 124 may be the same or different than the wellbore supply conduit 110. For example, the well conduit 124 may be an extension of the wellbore supply conduit 110 into the wellbore 104 or may be tubing or other conduit that is coupled to the wellbore supply conduit 110. The treatment fluid may be allowed to flow down the interior of well conduit 124, exit the well conduit 124, and finally enter subterranean formation 114 surrounding wellbore 104 by way of perforations 120 through the casing 116 (if the wellbore is cased as in FIG. 1) and cement sheath 118. Without limitation, the treatment fluid may be introduced into subterranean formation 114 whereby one or more fractures (not shown) may be created or enhanced in subterranean formation 114. For example, the treatment fluid may be introduced into subterranean formation 114 at or above a fracturing pressure. As previously, described, the treatment fluid comprising the diverting agent particulates may be placed into the subterranean formation 114 after a previous treatment has been performed such that additional locations in the subterranean formation 114 may be treated. Without limitation, at least a portion of the diverting agent may be deposited in the subterranean formation 114. As previously described, the diverting agent may form a barrier to fluid flow in the subterranean formation.

As previously described, a variety of treatments may be performed using the diverting agent. Suitable subterranean treatments may include, but are not limited to, drilling operations, production stimulation operations (e.g., fracturing, acidizing), and well completion operations (e.g., gravel packing or cementing). These treatments may generally be applied to the subterranean formation. The barrier to fluid flow formed in the subterranean formation 114 by the diverting agent may be used in these treatments for diversion and fluid loss control, among others. For example, the diversion of the treatment fluids may help ensure that the treatment fluids are more uniformly distributed in the subterranean formation.

Figure 2A:
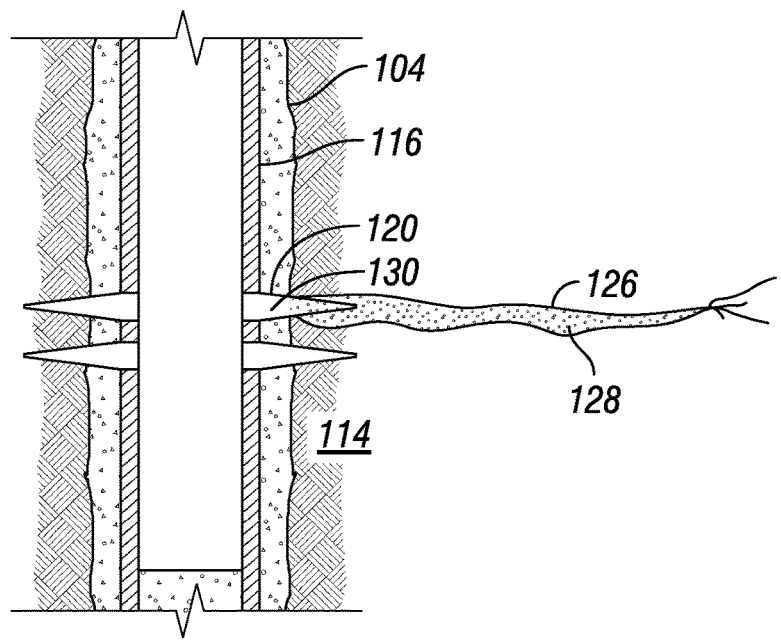
FIGS. 2a and 2b are schematic illustrations showing use of diverting agent particulates in an example fracturing treatment.

The well treatment may comprise a fracturing treatment in which one or more fractures may be created in subterranean formation 114. Referring now to FIG. 2A, fracture 126 is shown extending from wellbore 104. The fracturing of the subterranean formation 114 may be accomplished using any suitable technique. By way of example, a fracturing treatment may include introducing a fracturing fluid into subterranean formation 114 at or above a fracturing pressure. The fracturing fluid may be introduced by pumping the fracturing fluid through casing 116, perforations 120, and into subterranean formation 114 surrounding wellbore 104. Alternatively, a jetting tool (not shown) may be used to initiate the fracture 126. The fracturing fluid may comprise proppant particulates which may be deposited on the fracture 126 to form a proppant pack 128.

Figure 2B:
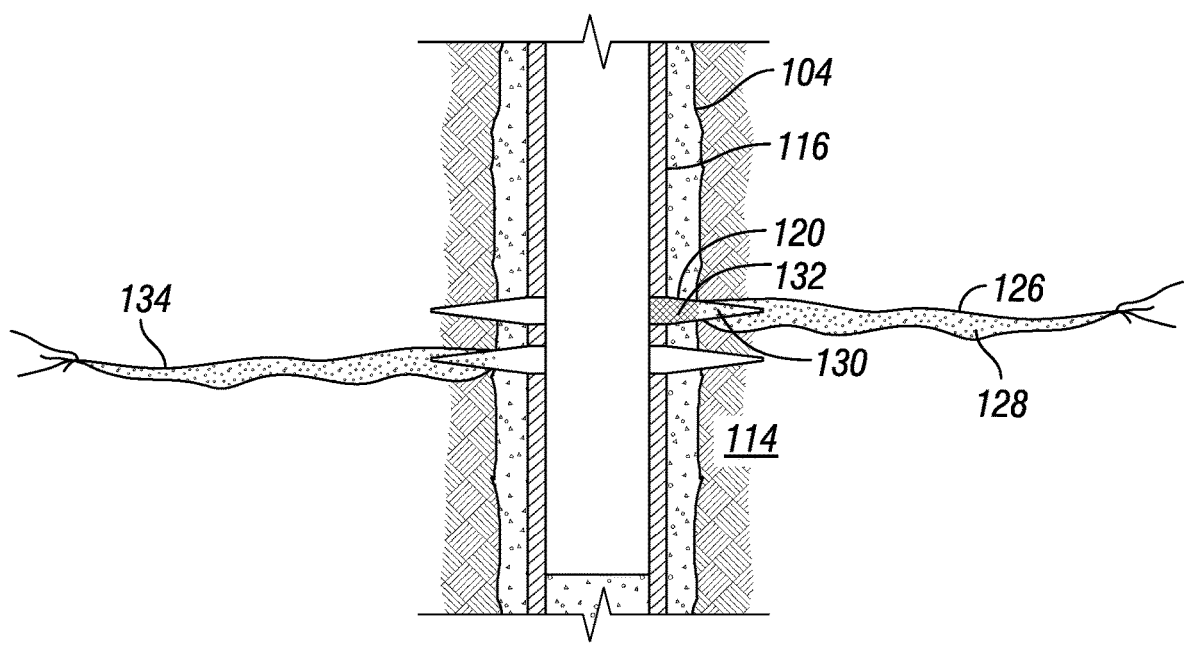

To form a barrier that can divert the fracturing fluid to additional flow paths, the diverting agent may be introduced into the subterranean formation 114. The diverting agent may be carried into the subterranean formation 114 in a treatment fluid. The diverting agent may be introduced through the perforation 120 and into a perforation tunnel 130. Without limitation, the treatment fluid comprising the diverting agent may be a slug of the fracturing fluid comprising the diverting agent or a separate treatment fluid comprising the diverting agent. The treatment fluid comprising the diverting agent may be introduced above the fracturing pressure or at matrix flow rates. Without limitation, the proppant pack 128 may act as a filter screening the diverting agent out of the treatment fluid. As a result, a layer or pack of the diverting agent may form on the proppant particulates, in the perforation tunnel 130, or both. As shown in FIG. 2B, a barrier 132 comprising the diverting agent may be formed in the perforation tunnel 130. The resulting barrier 132 may be able to divert fluids away from fracture 126. Such diversion may result in a back pressure build up that may be detected at surface 112 (e.g., shown on FIG. 1). After formation of the barrier 132, additional subterranean treatments may be performed. As shown on FIG. 2B, additional fracture 134 may be created in subterranean formation 114. Additional fracture 134 may be formed, for example, in a portion of subterranean formation 114 with least resistance to fluid flow, as barrier 132 has diverted the fracturing fluid into additional portions of the subterranean formation 114 in which treatment may be desired.

The exemplary diverting agent particulates disclosed herein may directly or indirectly affect one or more components or pieces of equipment associated with the preparation, delivery, recapture, recycling, reuse, and/or disposal of the diverting agent particulates. For example, the diverting agent particulates may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the sealant composition. The diverting agent particulates may also directly or indirectly affect any transport or delivery equipment used to convey the diverting agent particulates to a well site or downhole such as, for example, any transport vessels, conduits, pipelines, trucks, tubulars, and/or pipes used to compositionally move the diverting agent particulates from one location to another, any pumps, compressors, or motors (e.g., topside or downhole) used to drive the diverting agent particulates into motion, any valves or related joints used to regulate the pressure or flow rate of the diverting agent particulates (or fluids containing the same diverting agent particulates), and any sensors (i.e., pressure and temperature), gauges, and/or combinations thereof, and the like. The disclosed diverting agent particulates may also directly or indirectly affect the various downhole equipment and tools that may come into contact with the diverting agent particulates such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples of certain aspects of some of the systems and methods are given. In no way should the following examples be read to limit, or define, the entire scope of the disclosure.

Example 1

Figure 3:
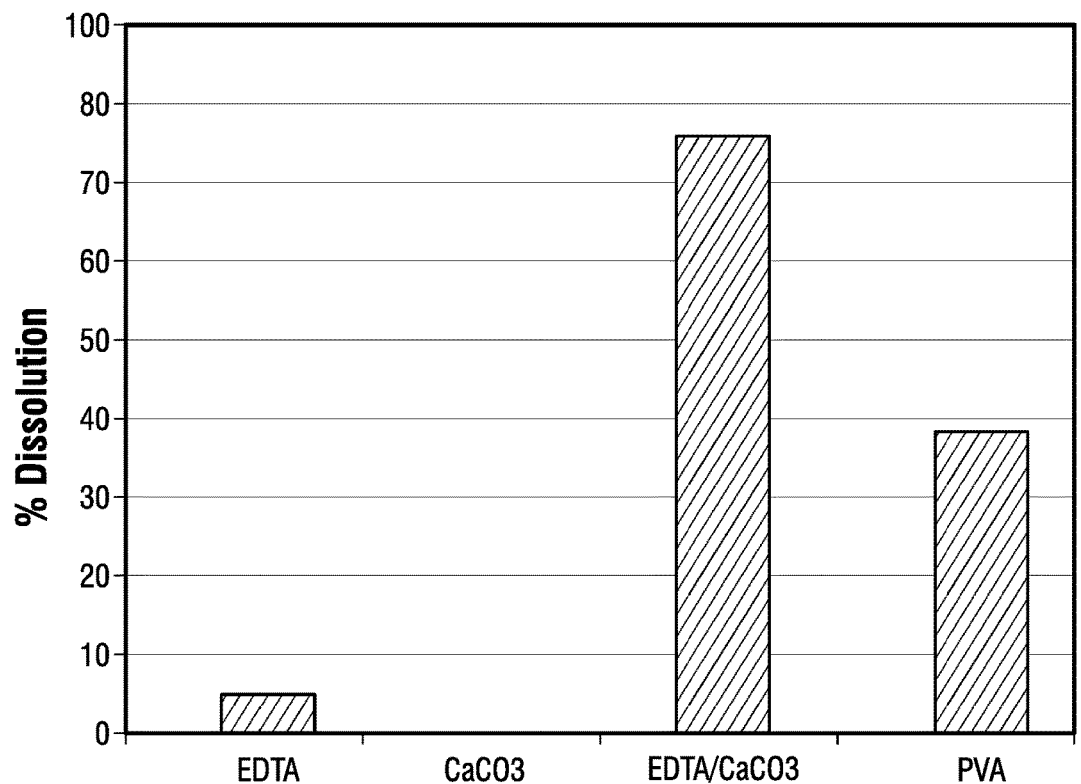
FIG. 3 is a diagram showing the results from a dissolution test.

A dissolution test was prepared with individual samples of EDTA, calcium carbonate, calcium carbonate and EDTA, and PVA. Water was added to each sample and then each sample was stored at 110° F. (43.33° C.) for 24 hours. The samples were then measured to find the mass of sample that had dissolved. It was observed that after 24 hours EDTA had 4% dissolution, calcium carbonate had 0% dissolution, EDTA and calcium carbonate had 78% dissolution, and PVA had 39% dissolution. These results are illustrated in FIG. 3 It was observed that EDTA dissolved less than 5% and calcium carbonate dissolved negligibly. Furthermore, the combination of EDTA and calcium carbonate dissolved about 75%. PVA was observed to dissolve 39%.

Example 2

Figure 4:
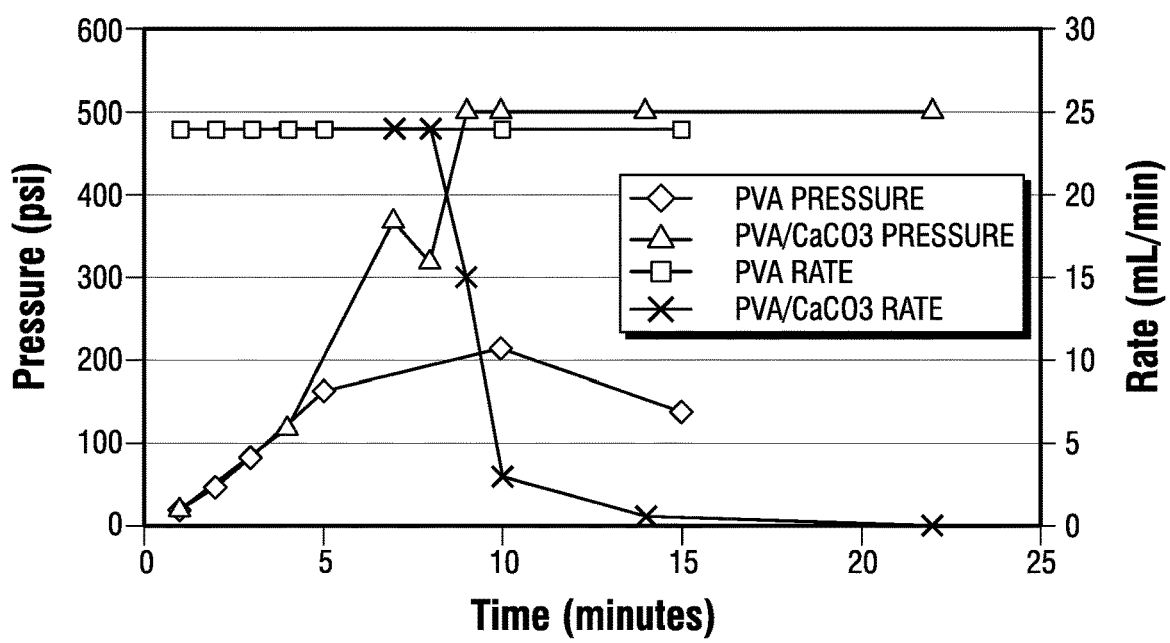
FIG. 4 is a diagram showing results from a fluid loss test.

A fluid loss test was performed to test the effects of calcium carbonate on fluid loss rate. A sample of PVA suspension was passed through a 500 micron slotted disk and pressurized with water. The fluid leak off rate and pressure was measured. It was observed that the rate of fluid loss was constant at about 24 mL/min for about 15 minutes. It was further observed that the pressure measured increased from 0 psig (pounds per square inch gauge) (0 kPa gauge) to about 210 psig (1447.9 kPa gauge) over about 10 minutes and then decreased to about 130 psig (896.318 kPa gauge) at about 15 minutes. A sample of solid state suspension comprising PVA and calcium carbonate was placed on a 2000 micron disk and pressurized. It was observed that the fluid leak off rate was about 24 mL/min for approximately the first 8 minutes before dropping to about 1 mL/min at 14 minutes and eventually about 0 mL/min at about 22 minutes. It was further observed that the pressure steadily increased to about 500 psig (3447.38 kPa gauge) after about 8 minutes and remained steady until about 22 minutes. The results are illustrated in FIG. 4. The results indicate that a solid state solution comprising PVA and calcium carbonate may be more effective at fluid loss control than PVA by itself.

Example 3

Figure 5:
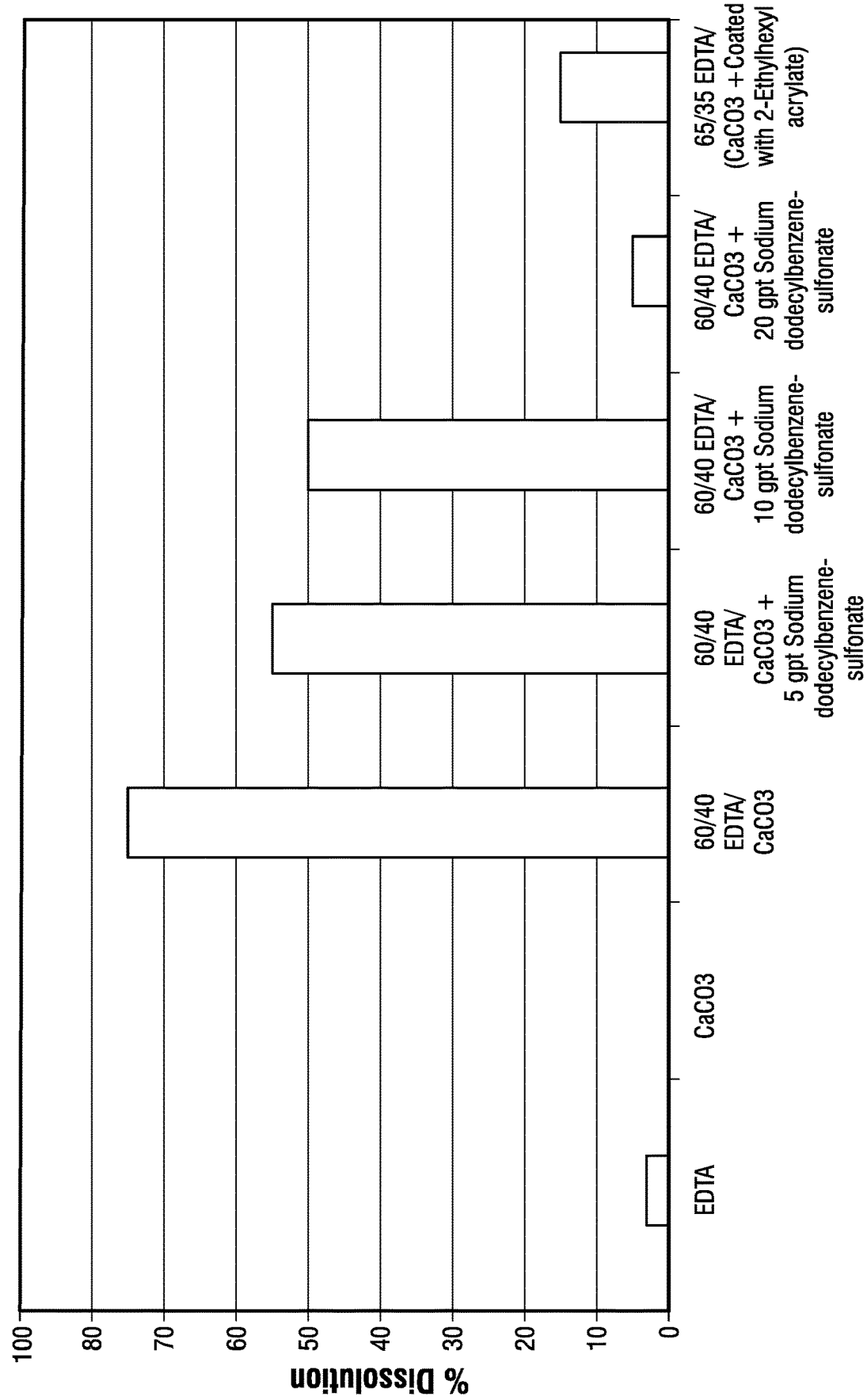
FIG. 5 is a diagram showing the results from a dissolution test.

A dissolution test was prepared with individual samples of EDTA, calcium carbonate, 60/40 weight ratio EDTA and calcium carbonate, 60/40 weight ratio EDTA and calcium carbonate and 5 gallons per thousand gallons (gpt) sodium dodecylbenzenesulfonate, 60/40 weight ratio EDTA and calcium carbonate and 10 gpt sodium dodecylbenzenesulfonate, 60/40 weight ratio EDTA and calcium carbonate and 20 gpt sodium dodecylbenzenesulfonate, and 65/35 EDTA and calcium carbonate coated with 2-ethylhexyl acrylate. Water was added to each sample and then each sample was stored at 110° F. (43.33° C.) for 24 hours. The results are illustrated in FIG. 5. It was observed that the dissolution of EDTA and calcium carbonate was slowed by the addition of sodium dodecylbenzenesulfonate and the rate of slowing increased with increasing concentration of sodium dodecylbenzenesulfonate. Additionally it was observed that 2-ethylhexyl acrylate reduced the rate of dissolution of the calcium carbonate.

Example 4

Figure 6:
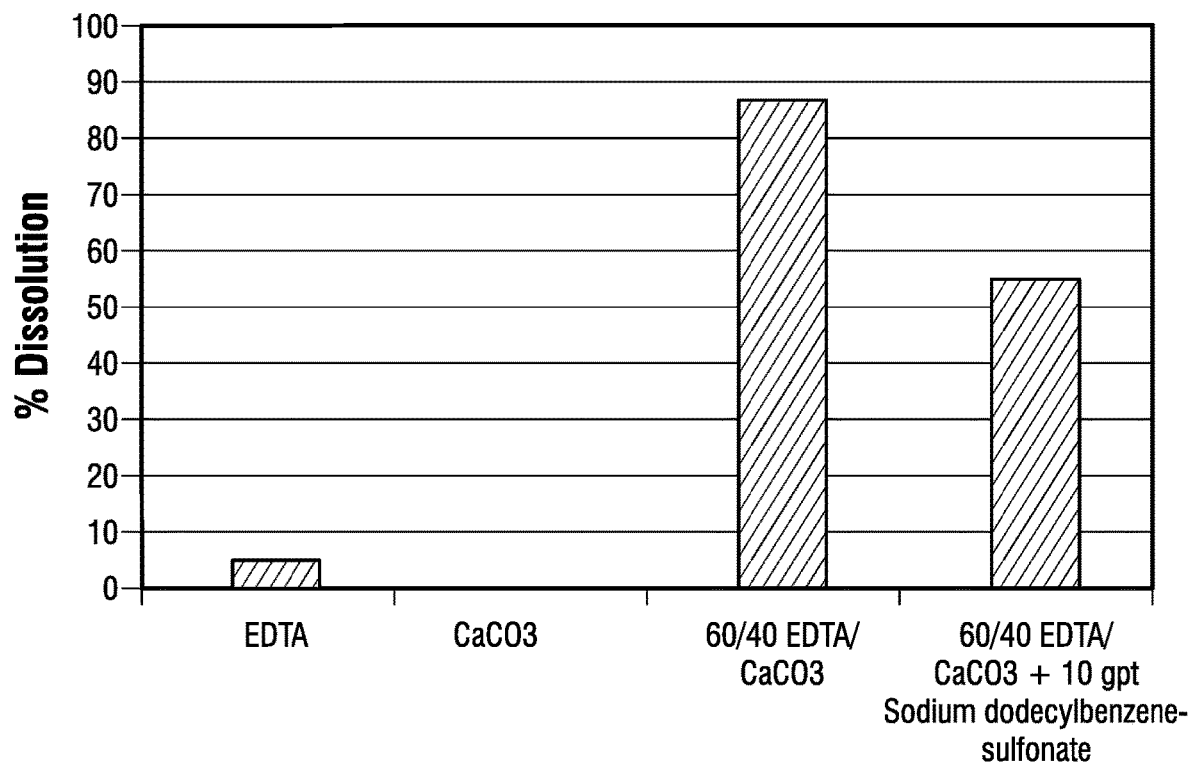
FIG. 6 is a diagram showing the results from a dissolution test.

A dissolution test was prepared with individual samples of EDTA, calcium carbonate, 60/40 weight ratio EDTA and calcium carbonate, 60/40 weight ratio EDTA and calcium carbonate and 10 (gpt) sodium dodecylbenzenesulfonate. Water was added to each sample and then each sample was stored at 160° F. (71.11° C.) for 4 hours. It was observed that 60/40 weight ratio EDTA and calcium carbonate dissolved 89% as opposed to 75% for the test at 110° F. (43.33° C.) for 24 hours. Additionally it was observed that sample containing sodium dodecylbenzenesulfonate dissolved approximately the same for the test at 110° F. (43.33° C.) as the test at 160° F. (71.11° C.). The results are illustrated in FIG. 6.

Example 5

Figure 7:
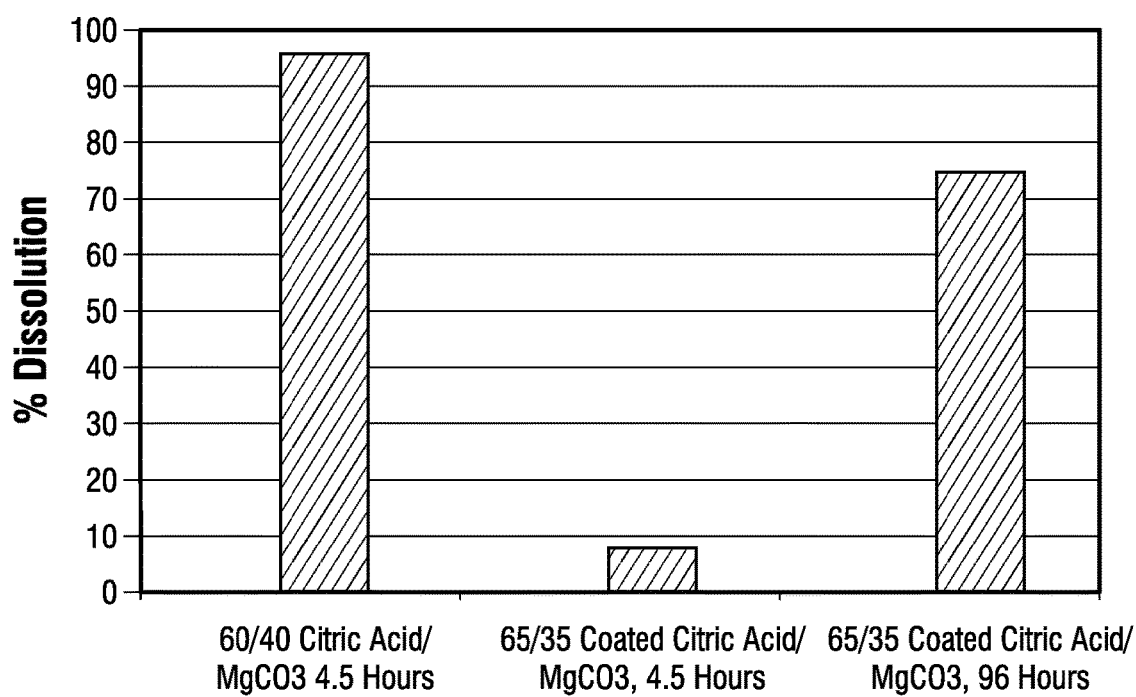
FIG. 7 is a diagram showing the results from a dissolution test.

A dissolution test was prepared with individual samples of 60/40 weight ratio citric acid and magnesium carbonate and 65/35 weight ratio coated citric acid and magnesium carbonate. Water was added to each solution and the solutions were stored at 110° F. (43.33° C.). It was observed that the 60/40 citric acid and magnesium carbonate dissolved 95% after 4.5 hours while the 65/35 coated citric acid and magnesium carbonate dissolved 5% after 4.5 hours. The 65/35 sample was allowed to remain at 110° F. (43.33° C.) for 96 hours after which it has dissolved 75%. The results are illustrated in FIG. 7.

Example 6

Figure 8:
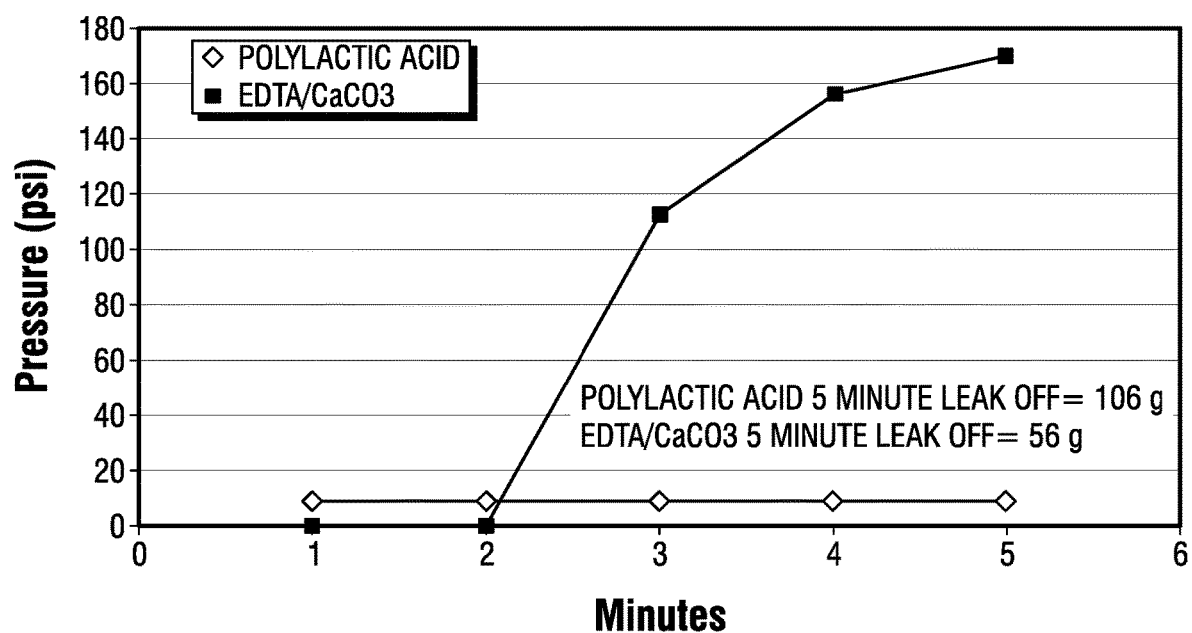
FIG. 8 is a diagram showing results from a fluid loss test.

A fluid loss test was prepared to compare commercially available polylactic acid diverter to a mixture of EDTA and calcium carbonate. The EDTA and calcium carbonate solution contained 1 pound per gallon of solids wherein the solids contained 60 wt. % EDTA, 17.5 wt. % calcium carbonate with a D50 particle size of 1200 microns, 17.5 wt. % calcium carbonate with a D50 particle size of 600 microns, 5 wt. % calcium carbonate with a D50 particle size of 50 microns and 20 gpt sodium dodecylbenzenesulfonate. Each fluid was heated to 110° F. (43.33° C.) and passed through a 300 micron slotted disk and pressurized. It was observed that the polylactic acid diverter failed to build pressure while the EDTA and calcium carbonate solution built pressure up to 170 psi after 5 minutes. Additionally it was observed that the PLA sample allowed almost twice as much leak off as the EDTA and calcium carbonate solution. The results are illustrated in FIG. 8.

Example 7

A dissolution test was prepared with individual samples of potassium chloride and potassium chloride and PLA composite. The samples were added to room temperature tap water and allowed to rest. It was observed that the potassium chloride sample was fully dissolved in less than one minute while the potassium chloride and PLA composite was slower to dissolve. The results are illustrated in Table 1 below.

TABLE 1

| | Composition | % of material left after | | |
| --- | --- | --- | --- | --- |
| | | 1 min | 15 min | 60 minutes |
| 1 | KCl | 0 | 0 | 0 |
| 2 | KCl/PLA composite | 85% | 73% | 66% |
| 3 | PLA | 100% | 100% | 100% |

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of treating a subterranean formation, the method comprising:
   providing a treatment fluid comprising:
      a base fluid; and
      a solid state suspension comprising:
         a continuous phase comprising a soluble or degradable coating;
         a carbonate compound; and
         a solid acid;
   introducing the treatment fluid into a wellbore penetrating the subterranean formation, wherein the solid state suspension at least partially plugs a zone in the subterranean formation; and
   allowing the solid state suspension to dissolve.

2. The method of claim 1 wherein the solid acid is selected from the group consisting of ethylenediaminetetraacetic acid, citric acid, benzoic acid, and combinations thereof.

3. The method of claim 1 wherein the treatment fluid further comprises a proppant.

4. The method of claim 1 wherein the step of pumping comprises pumping the treatment fluid into the subterranean formation at or above a fracture gradient of the subterranean formation.

5. The method of claim 1 wherein the carbonate compound is present in an amount of about 30% to about 60% by weight of the solid state suspension.

6. The method of claim 1 wherein the acid is present in an amount of about 40% to about 60% by weight of the solid state suspension.

7. The method of claim 1 wherein the treatment fluid further comprises a proppant, and wherein the step of pumping further comprises pumping the treatment fluid into the subterranean formation at or above a fracture gradient of the subterranean formation.

8. The method of claim 7 wherein the polymeric coating comprises a soluble or degradable polymer selected from the group consisting of polyvinyl alcohol (PVA), polylactic acid (PLA), polyacrylamide, and combinations thereof.

9. The method of claim 1 wherein the step of pumping comprises pumping the treatment fluid into the subterranean formation below the fracture gradient of the subterranean formation.

10. A method of treating a subterranean formation, the method comprising:
    providing a treatment fluid comprising:
       a base fluid; and
       a solid state suspension comprising:
          a continuous polymeric phase, a carbonate compound, and a solid acid, wherein the carbonate compound and solid acid are in particulate form, and wherein the carbonate compound and solid acid are interspersed throughout the continuous polymeric phase;
    introducing the treatment fluid into a wellbore penetrating the subterranean formation, wherein the solid state suspension at least partially plugs a zone in the subterranean formation; and
    allowing the solid state suspension to dissolve.

11. The method of claim 10 wherein the solid acid is selected from the group consisting of ethylenediaminetetraacetic acid, citric acid, benzoic acid, and combinations thereof.

12. The method of claim 10 wherein the treatment fluid further comprises a proppant.

13. The method of claim 10 wherein the step of pumping comprises pumping the treatment fluid into the subterranean formation at or above a fracture gradient of the subterranean formation.

14. The method of claim 10 wherein the treatment fluid further comprises a proppant, and wherein the step of pumping further comprises pumping the treatment fluid into the subterranean formation at or above a fracture gradient of the subterranean formation.

15. The method of claim 10 wherein the carbonate compound is present in an amount of about 30% to about 60% by weight of the solid state suspension.

16. The method of claim 15 wherein the polymeric coating comprises a soluble or degradable polymer selected from the group consisting of polyvinyl alcohol (PVA), polylactic acid (PLA), polyacrylamide, and combinations thereof.

17. The method of claim 10 wherein the acid is present in an amount of about 40% to about 60% by weight of the solid state suspension.

18. The method of claim 10 wherein the step of pumping comprises pumping the treatment fluid into the subterranean formation below the fracture gradient of the subterranean formation.

19. The method of claim 18 wherein the solid state suspension comprises a solid acid selected from the group consisting of ethylenediaminetetraacetic acid, citric acid, benzoic acid, and combinations thereof.

20. The method of claim 18 wherein the polymeric coating comprises a degradable or dissolvable polymer selected from the group consisting of polyvinyl alcohol (PVA), polylactic acid (PLA), polyacrylamide, and combinations thereof.

21. The method of claim 18 wherein the treatment fluid consists of 45% to 99.89% base fluid by volume of the treatment fluid.

22. A method of treating a subterranean formation, the method comprising:

providing a treatment fluid comprising:

a base fluid; and a solid state suspension comprising:

a continuous polymeric phase, a carbonate compound, and a solid acid, wherein the carbonate compound and solid acid are in particulate form, wherein the carbonate compound and solid acid are interspersed throughout the continuous polymeric phase, wherein the carbonate compound is present in an amount of about 30% to about 60% by weight of the solid state suspension, wherein the solid acid is present in an amount of about 40% to 60% by weight of the solid state suspension; and proppant particulate;

introducing the treatment fluid into a wellbore penetrating the subterranean formation, above a fracture gradient of the subterranean formation, wherein the solid state suspension at least partially plugs a zone in the subterranean formation; and allowing the solid state suspension to dissolve.

* * * * *